US012296552B2

(12) United States Patent
De Santis et al.

(10) Patent No.: US 12,296,552 B2
(45) Date of Patent: May 13, 2025

(54) PUNCH PRESS

(71) Applicant: Bruderer AG, Frasnacht (CH)

(72) Inventors: Ugo De Santis, Roggwil (CH); Josef Thomas Hafner, Rorschacherberg (CH)

(73) Assignee: BRUDERER AG, Frasnacht (CH)

( * ) Notice: Subject to any disclaimer, the term of this patent is extended or adjusted under 35 U.S.C. 154(b) by 655 days.

(21) Appl. No.: 17/603,813

(22) PCT Filed: Apr. 16, 2019

(86) PCT No.: PCT/EP2019/059833
§ 371 (c)(1),
(2) Date: Oct. 14, 2021

(87) PCT Pub. No.: WO2020/211931
PCT Pub. Date: Oct. 22, 2020

(65) Prior Publication Data

US 2022/0212431 A1 Jul. 7, 2022

(51) Int. Cl.
*B30B 1/06* (2006.01)
*B30B 15/00* (2006.01)

(52) U.S. Cl.
CPC ............ *B30B 15/0064* (2013.01); *B30B 1/06* (2013.01)

(58) Field of Classification Search
CPC .... B30B 1/06; B30B 1/14; B30B 1/26; B30B 15/0064
See application file for complete search history.

(56) References Cited

U.S. PATENT DOCUMENTS 3,422,688 A 1/1969 Bruderer
3,783,699 A * 1/1974 Portmann ........... B30B 15/0064 74/40
5,052,257 A * 10/1991 Eigenmann ......... B30B 15/0064 83/530
5,138,922 A * 8/1992 Eigenmann ......... B30B 15/0064 100/282
5,531,160 A * 7/1996 Eigenmann ............... B30B 1/06 100/285
6,055,903 A * 5/2000 Eigenmann ......... B30B 15/0064 100/285

FOREIGN PATENT DOCUMENTS

CH 581281 A5 10/1976
DE 2434266 A1 1/1976
EP 0455988 A1 11/1991
EP 0395964 B1 4/1993
GB 1390420 A 4/1975
JP S6475200 A 3/1989

OTHER PUBLICATIONS

International Search Report for Application No. PCT/EP2019/059833 dated Jan. 22, 2020.

* cited by examiner

*Primary Examiner* — Jimmy T Nguyen
(74) *Attorney, Agent, or Firm* — McCormick, Paulding & Huber, PLLC

(57) ABSTRACT

The invention relates to a punch press with a crank or eccentric drive, including a crank or eccentric shaft (1*a*, 1*b*) and active connecting rods (9*a*, 9*b*) for generating the stroke movement of the press ram (13). Furthermore, the punch press includes balancing weights (2*a*, 2*b*) for balancing the vertical and horizontal mass forces and is designed in such a way that the horizontal drive movements required for the horizontal mass balancing are tapped directly at the crank or eccentric shaft (1*a*, 1*b*), preferably laterally at the crank or eccentric shaft (1*a*, 1*b*).

20 Claims, 3 Drawing Sheets

PUNCH PRESS

CROSS-REFERENCE TO RELATED APPLICATIONS

This application is a National Stage application of International Patent Application No. PCT/EP2019/059833, filed on Apr. 16, 2019, which is hereby incorporated by reference in its entirety.

TECHNICAL FIELD

The present invention relates to a punch press with a crank or eccentric drive.

BACKGROUND

For the industrial production of punched parts from sheet metal strips, high-speed automatic punching presses with crank or eccentric drive are used today, in which an upper tool part is moved towards a lower tool part and cuts and shapes are made on the sheet metal strip.

In order to keep the vibrations of the punch press as low as possible during operation and to enable a good work result, the inertial forces generated by the movements of the punch drive and the ram must be compensated as completely as possible within the press structure. For this purpose, modern punch presses have balancing weights which are mounted inside the housing structure of the press and, during operation, are moved in the opposite direction to the press ram and the components of the ram drive, so that they compensate for a large part of the inertial forces generated by these within the press.

A punch press is known from CH 581 281 A5 in which the drive movement for the balancing weights for the vertical mass balancing is taken from the thrust shackles of the ram drive, while the drive movement for the horizontal mass balancing is taken from the connecting rod directly above the eccentric shaft.

Another punch press is known from EP 0 395 964 B1, in which the drive movement for the balancing weights for the vertical mass balancing is tapped directly at the eccentric shaft by means of a separate passive connecting rod, while the drive movement for horizontal mass balancing is tapped below the eccentric shaft at the lower free end of the active connecting rod.

Even though both types of press are very successful products, they both have the disadvantage that any vibrations of the components used for mass balancing that occur during operation can be transmitted to the press ram and thus have a negative effect on the cutting or embossing process.

SUMMARY

The objective is therefore to provide a technical solution which does not have the aforementioned disadvantage of the prior art or at least partially avoids it.

This objective is reached by the punch press with a crank or eccentric drive, comprising a crank or eccentric shaft and active connecting rods for generating stroke movement of a press ram, and with balancing weights for balancing vertical and horizontal mass forces, wherein the punch press is adapted in such a way that horizontal drive movements required for horizontal mass balancing are tapped directly at the crankshaft or eccentric shaft.

It relates to a punch press with a crank or eccentric drive, which has a crank or eccentric shaft and associated active connecting rods according to the claim for generating the stroke movement of the press ram. Furthermore, the punch press has balancing weights for balancing the vertical and horizontal mass forces generated during operation by the movements of the ram drive and the ram.

According to the invention, the punch press is designed in such a way that the horizontal drive movements required for horizontal mass balancing are tapped directly at the crankshaft or eccentric shaft, preferably laterally at the crankshaft or eccentric shaft. "Laterally at the crankshaft or eccentric shaft" means that the horizontal movements of a crankpin or an eccentric of the crankshaft or eccentric shaft are tapped directly at the crankpin or eccentric in the area between two horizontal planes which are adjacent to the crankshaft or eccentric shaft from below and from above.

The construction method according to the invention can prevent any vibrations occurring during operation of the components used for horizontal mass balancing from being transmitted to the press ram and thus negatively influencing the cutting or embossing process.

In a preferred embodiment, the punch press is designed in such a way that the drive movements required for vertical mass balancing are tapped directly at the crankshaft or eccentric shaft, preferably above the crankshaft or eccentric shaft. "Above the crankshaft or eccentric shaft" means that the vertical movements of a crankpin or an eccentric of the crankshaft or eccentric shaft are tapped directly above the crankshaft or eccentric shaft at the crankpin or eccentric in the area between two vertical planes which are adjacent to the crankshaft or eccentric shaft from both sides.

Preferably, the punch press is designed in such a way that the drive movements required for horizontal mass balancing are tapped via components on the crankshaft or eccentric shaft and transmitted to the balancing weights, which are designed separately from the components serving to drive the ram. This allows maximum decoupling of any vibrations occurring during operation of the components serving for horizontal mass balancing from the ram and thus from the cutting or embossing process.

Advantageously, even all the drive movements required for mass balancing, i.e. both the drive movements required for horizontal and vertical mass balancing, are tapped via components on the crankshaft or eccentric shaft and transmitted to the balancing weights, which are designed separately from the components serving the ram drive. This makes it possible to achieve maximum decoupling of any vibrations occurring during operation of the components serving for mass balancing from the press ram and thus from the cutting or embossing process.

The drive movements required for horizontal mass balancing are preferably tapped by auxiliary connecting rods, according to the claims, engaging on a crank pin or eccentric of the crankshaft or eccentric shaft, which can be designed completely independently or also together with the active connecting rods or any connecting rods for picking up the drive movements for vertical mass balancing (passive connecting rods according to the claims).

It is advantageous that the auxiliary connecting rods extend from the crankshaft or eccentric shaft in a direction transverse to the intended direction of movement of the press ram, i.e. in a substantially horizontal direction pointing away from the crankshaft or eccentric shaft.

The ends of the auxiliary connecting rods facing away from the crankshaft or eccentric shaft are advantageously coupled in each case to one end of a pivotably mounted double lever, preferably articulated thereto. The second end of this double lever is coupled directly or via other coupling elements to a balancing weight for horizontal mass balancing, preferably articulated thereto.

It is further preferred that the ends of the auxiliary connecting rods facing away from the crankshaft or eccentric shaft are each coupled to the end of the respective pivotably mounted double lever via a link.

The second end of this double lever is preferably coupled to the respective balancing weight for horizontal mass balancing via a respective link.

These aforementioned embodiments have proven to be particularly suitable for picking up and transmitting the drive movements required for horizontal mass balancing.

In a particularly preferred embodiment of the punch presses, in which the drive movements required for horizontal mass balancing are tapped via auxiliary connecting rods, engaging on a crank pin or eccentric of the crank or eccentric shaft, these auxiliary connecting rods are designed separately from the active connecting rods, which serve to generate the stroke movement of the press ram.

This allows maximum decoupling of any vibrations occurring during operation of the components serving for horizontal mass balancing from the press ram and thus from the cutting or embossing process.

In another preferred embodiment, these auxiliary connecting rods are each formed together with the active connecting rods, which serve to generate the stroke movement of the press ram. This can be expediently achieved by a one-piece joint design of one active connecting rod and one auxiliary connecting rod, e.g. in such a way that the eye of the active connecting rod on the crankshaft or eccentric shaft side also forms the eye of the auxiliary connecting rod on the crankshaft or eccentric shaft side, and that an auxiliary eye is formed laterally on this eye, which forms the eye of the auxiliary connecting rod facing away from the crankshaft or eccentric shaft. This makes it possible to achieve good decoupling of any vibrations occurring during operation of the components serving for horizontal mass balancing from the press ram and thus from the cutting or embossing process, and at the same time to implement a compact design with few separate components.

In yet another preferred embodiment, the punch press according to the invention is designed in such a way that the drive movements required for vertical mass balancing are tapped by passive connecting rods engaging on a crank pin or eccentric of the crankshaft or eccentric shaft, which can be designed completely independently or also together with the active connecting rods or any connecting rods for picking up the drive movements for horizontal mass balancing.

It is advantageous that the passive connecting rods extend from the crankshaft or eccentric shaft in a substantially vertical direction away from the press ram.

The ends of the passive connecting rods facing away from the crankshaft or eccentric shaft are advantageously coupled to one end of a pivotably mounted double lever, the second end of which is coupled directly or via further coupling elements to a balancing weight for the vertical mass balancing.

It is further preferred that the respective balancing weight for the vertical mass balancing is carried by the respective end of the respective double lever.

These aforementioned embodiments have proven to be particularly suitable for picking up and transmitting the drive movements required for the vertical mass balancing.

In a further preferred embodiment of the punch presses, in which the drive movements required for the horizontal mass balancing are tapped via auxiliary connecting rods engaging on a crank pin or eccentric of the crank or eccentric shaft, and the drive movements required for the vertical mass balancing are tapped via passive connecting rods engaging on a crank pin or eccentric of the crank or eccentric shaft, these auxiliary connecting rods are formed in each case together with the passive connecting rods. This can be expediently achieved by the one-piece joint construction of a passive connecting rod and an auxiliary connecting rod, e.g. in such a way that the eye of the passive connecting rod on the crankshaft or eccentric shaft side also forms the eye of the auxiliary connecting rod on the crankshaft or eccentric shaft side, and that an auxiliary eye is formed laterally on this eye, which forms the eye of the auxiliary connecting rod facing away from the crankshaft or eccentric shaft. In this way, in particular with a separate design of the active connecting rods, very good decoupling of any vibrations occurring during operation of the components serving for mass balancing from the press ram and thus from the cutting and/or embossing process can be achieved, and at the same time a compact design with few separate components can be implemented.

In another preferred embodiment, the auxiliary connecting rods and the passive connecting rods are formed by separate components. This allows maximum decoupling of any vibrations occurring during operation of the components serving for the horizontal mass balancing and the components serving for the vertical mass balancing.

Advantageously, in the embodiment of the punch press according to the invention, in which the drive movements required for the horizontal mass balancing are tapped via auxiliary connecting rods engaging on a crank pin or eccentric of the crank or eccentric shaft and the drive movements required for the vertical mass balancing are tapped via passive connecting rods engaging on a crank pin or eccentric of the crank or eccentric shaft, at least some of the auxiliary connecting rods, passive connecting rods and active connecting rods are mounted on a common crank pin of the crankshaft or on a common eccentric of the eccentric shaft. This favors a compact design.

In the punch press according to the invention, the balancing weights for the horizontal mass balancing are advantageously arranged on both sides of the crankshaft or eccentric shaft. This concept has proved to be particularly suitable.

It is also preferred that the press is designed in such a way that each of the balancing weights serves to balance both horizontal and vertical mass forces. This favors a compact design with as few components as possible.

In yet another preferred embodiment, the punch press according to the invention is designed in such a way that the active connecting rods extend from the crankshaft or eccentric shaft in the direction of the press ram, wherein the ends of the active connecting rods facing away from the crankshaft or eccentric shaft are articulated in each case at one end of a single-sided lever. The other end of the respective single-sided lever is mounted in an articulated manner on the housing of the punch press, either directly or via further coupling elements. A thrust shackle is articulated to each of the single-sided levers in a region between their two ends and is connected to the press ram.

These aforementioned embodiments have proved to be particularly suitable for generating the stroke movement of the press ram.

BRIEF DESCRIPTION OF THE DRAWINGS

Further preferred embodiments of the invention result from the dependent claims and from the following description based on the figures. Thereby it is shown in:

DETAILED DESCRIPTION

Figure 1:
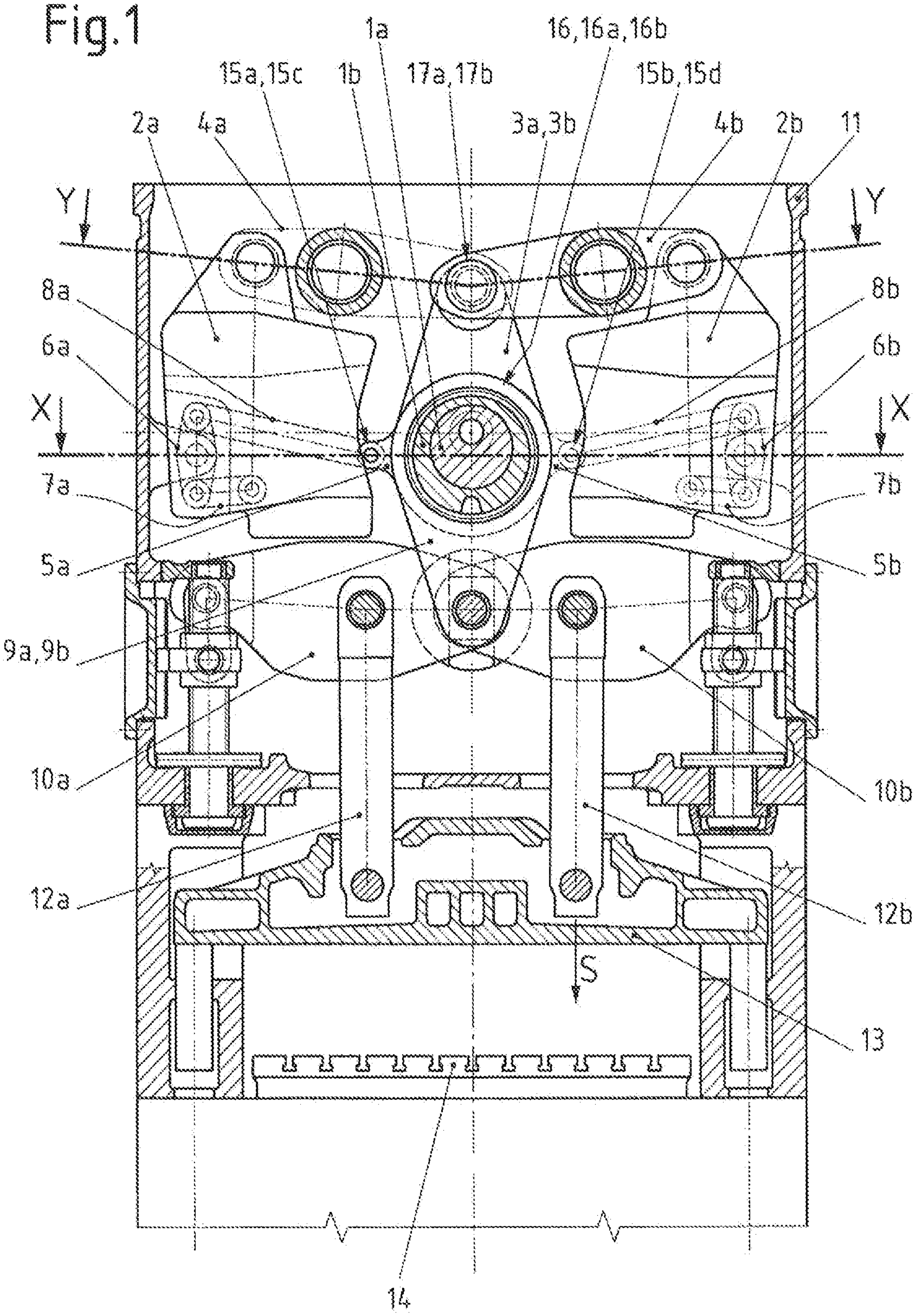
FIG. 1 a vertical section through a punch press according to the invention.

FIG. 1 shows a vertical section through a punch press according to the invention, in which, in the intended operation, the press ram 13, which is driven by an eccentric drive arranged in the upper part of the press structure 11, works from above against the clamping plate 14 of the press.

Figure 2:
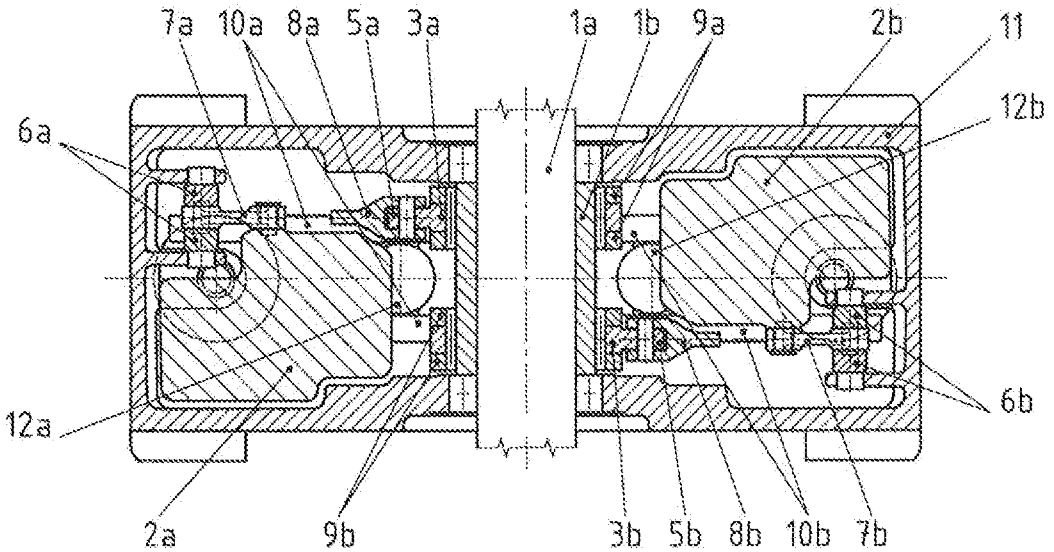
FIG. 2 a section along the line X-X in FIG. 1.

As can be seen in combination with FIG. 2, which shows a horizontal section through the press along the line X-X in FIG. 1, the ram 13 is driven by an eccentric shaft 1*a*, which has an eccentric bushing 1*b* for the purpose of adjusting the eccentricity.

Two pairs of active connecting rods 9*a*, 9*b* are arranged on the eccentric bushing 1*b*, which extend from the eccentric shaft 1*a*, 1*b* in the direction of the press ram 13. The ends of the active connecting rods 9*a*, 9*b* facing away from the eccentric shaft 1*a*, 1*b* are each articulated in pairs to one end of a substantially horizontally extending single-sided lever 10*a*, 10*b*, the other end of which is supported in an articulated way on the housing 11 of the punch press.

A thrust shackle 12*a*, 12*b* is articulated to each of the single-sided levers 10*a*, 10*b* in the area between the two ends, which is connected to the press ram 13 and moves it up and down in the intended operation.

In order to keep the vibrations of the punch press as low as possible during operation and to enable a good working result, the press has two balancing weights 2*a*, 2*b* arranged on both sides of the eccentric shaft 1*a*, 1*b*, which are mounted inside the housing structure 11 of the press and during operation move in the opposite direction to the press ram 13 and to the components of the ram drive 9*a*, 9*b*; 10*a*, 10*b*; 12*a*, 12*b*, so that they balance to a large extent the vertical and horizontal inertial forces generated by these within the press.

Figure 3:
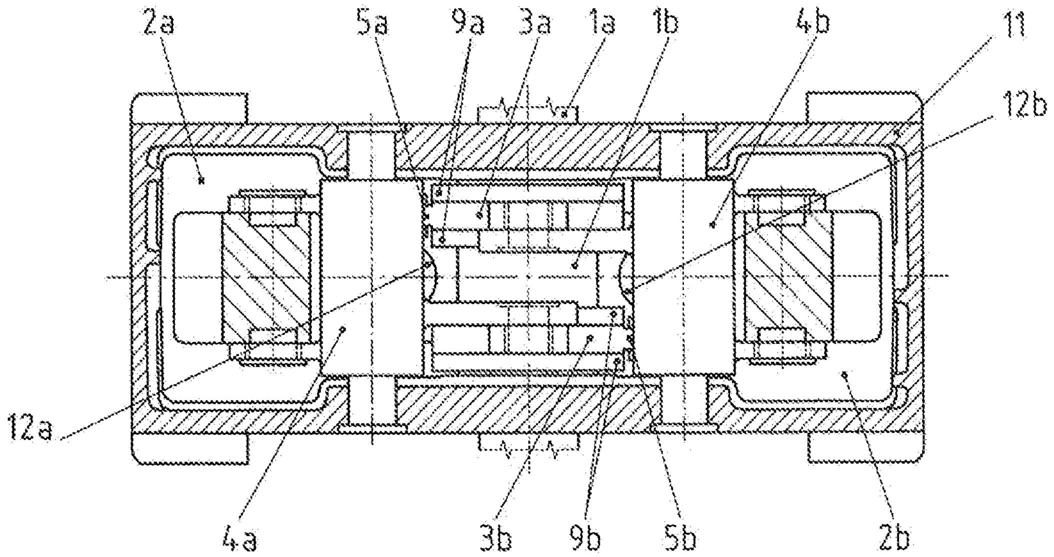
FIG. 3 a section along the line Y-Y in FIG. 1.

As can be seen in conjunction with FIG. 3, which shows a substantially horizontal section along the line Y-Y in FIG. 1, the drive of the balancing weights 2*a*, 2*b* is designed in such a way that the drive movements required for the horizontal and the vertical mass balancing are tapped directly at the eccentric shaft 1*a*, 1*b*.

The drive movements required for the horizontal mass balancing are tapped laterally on both sides of the eccentric shaft 1*a*, 1*b* via auxiliary connecting rods 5*a*, 5*b* arranged on the eccentric bushing 1*b*, which extend from the eccentric shaft 1*a*, 1*b* in a direction transverse to the intended direction of movement S of the press ram 13.

The drive movements required for the vertical mass balancing are tapped above the crankshaft or eccentric shaft 1*a*, 1*b* via passive connecting rods 3*a*, 3*b* arranged on the eccentric bushing 1*b*, which extend from the eccentric shaft 1*a*, 1*b* in a direction pointing away from the press ram 13.

As can be seen from FIGS. 2 and 3, the auxiliary connecting rods 5*a*, 5*b* and the passive connecting rods 3*a*, 3*b* are formed by common components, i.e. a passive connecting rod 3*a* or 3*b* and an auxiliary connecting rod 5*a* or 5*b* are combined to form a common one-piece component. This is implemented in such a way that the eye 16*a*, 16*b* on the eccentric shaft side of the respective passive connecting rod 3*a*, 3*b* simultaneously also forms the eye on the eccentric shaft side of the associated auxiliary connecting rod 5*a*, 5*b*, and that an auxiliary eye 15*a*, 15*b* is formed laterally on this eye 16*a*, 16*b*, which forms the eye of the respective auxiliary connecting rod 5*a*, 5*b* facing away from the eccentric shaft. The active connecting rods 9*a*, 9*b* are formed separately from the auxiliary connecting rods 5*a*, 5*b* and the passive connecting rods 3*a*, 3*b*.

The ends of the auxiliary connecting rods 5*a*, 5*b* facing away from the eccentric shaft 1*a*, 1*b*, which are formed by the auxiliary eyes 15*a*, 15*b*, are each coupled via a link 8*a*, 8*b* to one end of a pivotably mounted double lever 6*a*, 6*b*, the second end of which is coupled via a further link 7*a*, 7*b* to the lower end of one of the balancing weights 2*a*, 2*b*. The arrangement of the links and levers 7*a*, 8*a*, 6*a*, and 7*b*, 8*b*, 6*b*, respectively, is selected in such a way that a horizontal movement of the auxiliary eye 15*a*, 15*b* of the respective auxiliary rod 5*a*, 5*b* causes an opposite horizontal movement of the respectively associated balancing weight 2*a* or 2*b*.

The punch press is thus designed in such a way that the drive movements required for the horizontal mass balancing are tapped on the eccentric shaft 1*a*, 1*b* via components 5*a*, 5*b*; 6*a*, 6*b*; 7*a*, 7*b*; 8*a*, 8*b* and transmitted to the balancing weights 2*a*, 2*b*, which are designed separately from the components 9*a*, 9*b*; 10*a*, 10*b*; 12*a*, 12*b*, which serve to drive the ram.

The ends of the passive connecting rods 3*a*, 3*b* facing away from the eccentric shaft 1*a*, 1*b*, which are each formed by an eye 17*a*, 17*b*, are each articulated to one end of a pivotably mounted double lever 4*a*, 4*b*, the second, fork-shaped end of which is articulated to the upper end of one of the balance weights 2*a*, 2*b* and supports the latter. The arrangement is such that a vertical movement of the eye 17*a*, 17*b* of the respective passive connecting rod 3*a*, 3*b* causes an opposite vertical movement of the respective associated balancing weight 2*a* or 2*b*.

The punch press is thus also designed in such a way that the drive movements required for vertical mass balancing are tapped via components 3*a*, 3*b*; 4*a*, 4*b* on the eccentric shaft 1*a*, 1*b* and transmitted to the balancing weights 2*a*, 2*b*, which are designed separately from the components 9*a*, 9*b*; 10*a*, 10*b*; 12*a*, 12*b*, which serve to drive the ram.

Figure 4:
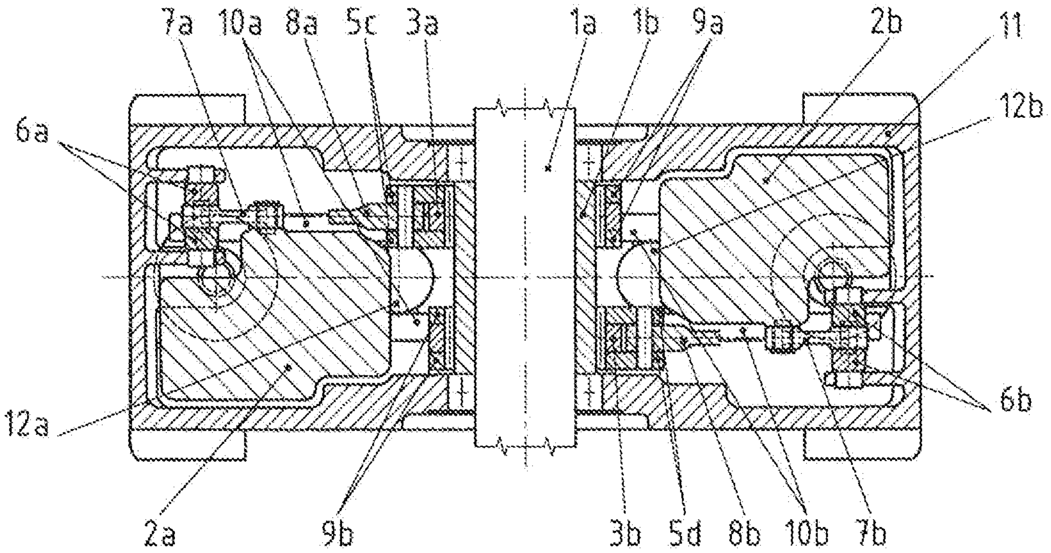
FIG. 4 a representation as in FIG. 2 of a variant of the punch press according to the invention.

FIG. 4 shows a section along the line X-X in FIG. 1 for a variant of the punch press according to the invention. This variant differs from the variant according to FIGS. 2 and 3 in that the auxiliary connecting rods 5*c*, 5*d* and the passive connecting rods 3*a*, 3*b* are formed by separate components.

Here, the auxiliary connecting rods 5*c*, 5*d* and the active connecting rods 9*a*, 9*b* are formed by common components, i.e. an active connecting rod 9*a* or 9*b* and an auxiliary connecting rod 5*c* or 5*d* are combined to form a common one-piece component. This is implemented in such a way that the eye 16 on the eccentric shaft side of the respective passive connecting rod 9*a*, 9*b* also forms the eye on the eccentric shaft side of the associated auxiliary connecting rod 5*c*, 5*d*, and that an auxiliary eye 15*c*, 15*d* is formed laterally on this eye 16, which forms the eye of the respective auxiliary connecting rod 5*c*, 5*d* facing away from the eccentric shaft 1*a*, 1*b*. The active connecting rods 9*a*, 9*b* and also the auxiliary connecting rods 5*c*, 5*d* are each formed here as pairs of connecting rods. The passive connecting rods 3*a*, 3*b* are formed separately from the active connecting rods 9*a*, 9*b*.

While preferred embodiments of the invention are described in the present application, it should be clearly noted that the invention is not limited to these and may also be carried out in other ways within the scope of the claims which now follow.

What is claimed is:

1. A punch press with a crank or eccentric drive, comprising a crank or eccentric shaft and active connecting rods for generating stroke movement of a press ram, and with balancing weights for balancing vertical and horizontal mass forces, wherein the punch press is adapted in such a way that horizontal drive movements required for horizontal mass balancing are tapped directly and laterally at the crankshaft or eccentric shaft, wherein the punch press is adapted in such a way that drive movements required for the vertical mass forces balancing are tapped directly at the crankshaft or eccentric shaft, wherein the press is adapted in such a way that each of the balancing weights serves to balance both horizontal and vertical mass forces, wherein the punch press is adapted in such a way that the active connecting rods extend from the crankshaft or eccentric shaft in a direction of the press ram, wherein the ends of the active connecting rods facing away from the crankshaft or eccentric shaft are each articulated to one end of a single-sided lever, the other end of which is mounted in an articulated manner on the housing of the punch press, either directly or via further coupling members, and wherein a thrust shackle, which is connected to the press ram, is articulated to each of the single-sided levers in a region between their two ends.

2. The punch press according to claim 1, wherein the punch press is adapted in such a way that the drive movements required for the horizontal mass forces balancing are tapped via components on the crankshaft or eccentric shaft and are transmitted to the balancing weights, which are formed separately from components serving to drive the ram.

3. The punch press according to claim 1, wherein the punch press is adapted in such a way that all the drive movements required for mass balancing are tapped via components at the crankshaft or eccentric shaft and are transmitted to the balancing weights, which are formed separately from components serving to drive the ram.

4. The punch press according to claim 1, wherein the punch press is adapted in such a way that the drive movements required for the horizontal mass forces balancing are tapped via auxiliary connecting rods engaging on the crankshaft or eccentric shaft.

5. The punch press according to claim 4, wherein the punch press is adapted in such a way that the auxiliary connecting rods extend from the crankshaft or eccentric shaft in a direction transverse to an intended direction of movement of the press ram.

6. The punch press according to claim 5, wherein the ends of the auxiliary connecting rods facing away from the crankshaft or eccentric shaft are each coupled to one end of a pivotably mounted double lever, the second end of which is coupled directly or via further coupling members to one of the balancing weights for the horizontal mass forces balancing.

7. The punch press according to claim 6, wherein the ends of the auxiliary connecting rods facing away from the crankshaft or eccentric shaft are each coupled via a link to the end of the respective pivotably mounted double lever.

8. The punch press according to claim 6, wherein the second end of the respective pivotably mounted double lever is coupled in each case via a link to the respective balancing weight for the horizontal mass balancing.

9. The punch press according to claim 4, wherein the auxiliary connecting rods and the active connecting rods are formed by separate components.

10. The punch press according to claim 4, wherein the auxiliary connecting rods and the active connecting rods are formed by common components.

11. The punch press according to claim 1, wherein the punch press is adapted in such a way that drive movements required for the vertical mass forces balancing are tapped via passive connecting rods engaging on the crankshaft or eccentric shaft.

12. The punch press according to claim 11, wherein the punch press is adapted in such a way that the passive connecting rods extend from the crankshaft or eccentric shaft in a direction pointing away from the press ram.

13. The punch press according to claim 12, wherein the ends of the passive connecting rods facing away from the crankshaft or eccentric shaft are each articulated to one end of a pivotably mounted double lever, the second end of which is articulated directly or via further coupling members to one of the balancing weights for the vertical mass forces balancing.

14. The punch press according to claim 13, wherein the respective balancing weight for the vertical mass balancing is supported by the respective end of the respective double lever.

15. The punch press according to claim 4, wherein the auxiliary connecting rods and passive connecting rods are formed by common components.

16. The punch press according to claim 4, wherein the auxiliary connecting rods and passive connecting rods are formed by separate components.

17. The punch press according to claim 4, wherein the auxiliary connecting rods, passive connecting rods and/or the active connecting rods are mounted on a common crank pin of the crankshaft or on a common eccentric of the eccentric shaft.

18. The punch press according to claim 1, wherein the balancing weights are arranged on both sides of the crankshaft or eccentric shaft for the horizontal mass forces balancing.

19. The punch press according to claim 1, wherein the punch press is adapted in such a way that the drive movements required for the vertical mass forces balancing are tapped above the crankshaft or eccentric shaft.

20. The punch press according to claim 5, wherein the ends of the auxiliary connecting rods facing away from the crankshaft or eccentric shaft are each articulated to one end of a pivotably mounted double lever, the second end of which is articulated directly or via further coupling members to one of the balancing weights for the horizontal mass forces balancing.

* * * * *